Oct. 4, 1955     F. K. H. NALLINGER     2,719,711

LINK JOINT

Filed March 23, 1950

United States Patent Office 2,719,711
Patented Oct. 4, 1955

2,719,711

LINK JOINT

Friedrich K. H. Nallinger, Stuttgart, Germany, assignor to Daimler-Benz Aktiengesellschaft, Stuttgart-Unterturkheim, Germany Application March 23, 1950, Serial No. 151,428

Claims priority, application Germany December 20, 1948

11 Claims. (Cl. 267—20)

This invention relates to a link joint for relatively swinging parts, in particular to link joints for motor vehicle wheels. It is a main object of this invention to provide for a noiseless operation of such link joints under deformation of a resilient material such that there can be taken up also relatively great swinging deflections in a convenient manner.

For the connection of parts subjected to swinging motions, instead of plain or antifriction bearings, use has been made to an increasing extent of resilient means, as for example rubber bushings, such means offering among other things the advantage of operating without requiring lubrication or the provision of clearances, simultaneously eliminating noise and being particularly adapted to take up shocks. Resilient connections or mountings of this type are used particularly in application to the guide members or guiding linkages of independently suspended motor vehicle wheels.

In many cases the elasticity of the resilient means will not be sufficient to take up the whole of the swinging motion of the relatively swinging parts. Thus, for instance, a particularly long springing stroke is required in modern motor vehicles which causes a substantial enlargement of the angle range of the linkage serving to guide the wheels. Increased dimensions of the resilient members forming the link joint corresponding to the increased stroke, for instance of the rubber bushings, however, may result in too soft mountings and an instability of the joint, thereby giving rise to further disadvantages in other respects, concerning the stability of the vehicle or the cost of production.

Preferably in order to avoid those difficulties this invention provides an arrangement in which the resilient members are coupled with at least one of the relatively swinging parts (for instance, the guide link or the frame of a motor vehicle) by frictional engagement in such a manner that the swinging motion is taken up by the resilient members only within the range of a certain swinging deflection, whilst beyond that range slipping will occur between the parts in frictional engagement with each other, thereby overcoming the friction. Thus when the frictional engagement has been established in the case of small swinging motions of normal amplitude, there will be a positive connection of the parts thus coupled, whilst for more ample swinging deflections of the relatively swinging parts the resilient means will be put under initial stress only up to the amount of their frictional resistance, and beyond that limit there will be no stressing owing to the slipping or sliding action or substantially no further stressing.

The resilient members of the link joint, preferably resilient sleeves of rubber or the like, may be coupled with the one or both of the relatively swinging parts through the interposition of a frictional connection. The sleeves are preferably positively connected at one or both of their inner or outer surfaces to bushings made of solid material and serving to reinforce said sleeves as by vulcanizing, bonding, tight fit, etc., the sleeves or each sleeve being coupled with the parts serving for their support by frictional engagement.

The bushings may be made of metal such as steel or plastic such as bakelite, and of any other material suitable for journaling swing parts, in particular of material having high anti-frictional qualities without there being the need of particular lubrication. In the case of metal, it may be lined for the purpose in question with a coating, such as copper, cadmium, or the like having self-lubricating properties.

In order to permit adjustment and control of the frictional engagement, particular arrangements may be provided. Thus, for instance, adjustment and control may be effected by varying the overlapping of the parts coupled by frictional engagement or, in the event of producing the frictional engagement by spring pressure, by varying the spring tension.

Some forms of embodiment of this invention are illustrated in the accompanying drawings as applied to the wheels guiding means of a motor vehicle.

Figure 1:
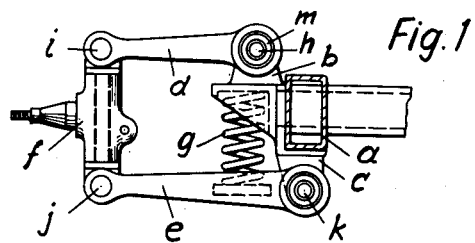
Fig. 1 is a view of a wheel guiding linkage with two superposed links and with rubber sleeves inserted in the joints.
Figure 2:
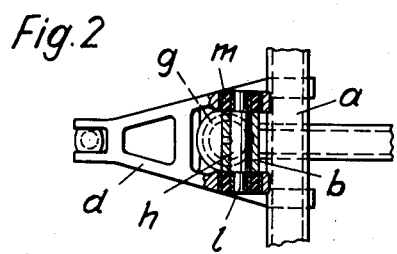
Fig. 2 is a plan view of the wheel guiding means of Fig. 1.

Referring now to Figs. 1 and 2 in which $a$ designates the frame, there are two links $d$ and $e$ supported on brackets $b$ and $c$ respectively on the frame, said links serving to guide, for example, the steerable wheel axle member $f$ carrying the vehicle wheel. The wheel is suspended for example by a helical spring $g$ abutting on the one hand against the lower link $e$ and on the other against a bracket attached to the frame. In the joints $h$ and $k$ and concentrically to the trunnion $l$ there are inserted rubber sleeves $m$ connected inside and at their periphery to bushings of metal or plastic as by vulcanizing, sticking, snug fit, or the like.

Figure 3:
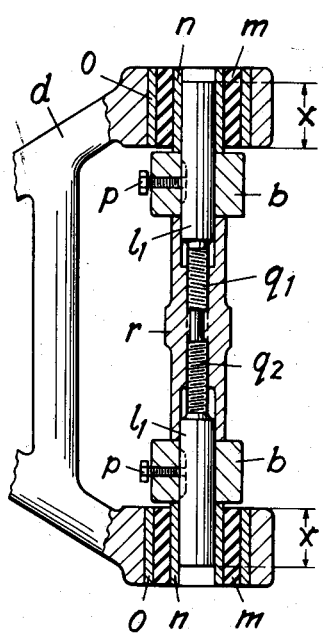
Fig. 3 is an adjusting device for controlling the frictional engagement in the pivotal mounting of a wheel guiding linkage.

Fig. 3 shows such a connection in a somewhat modified embodiment to an enlarged scale. The rubber sleeves $m$ are in this case reinforced with an inner bushing $n$ and an outer bushing $o$ in the manner just described, the outer bushing $o$ being forced into a corresponding bore in the link $d$, so as to be positively connected to the latter, while the inner bushings have been slipped upon the trunnion $l_1$ with such a fit and for such a length $x$ as to produce a predetermined frictional resistance against pivoting of the two parts $n$ and $l_1$ with relation to each other. A swinging motion of the link $d$ will therefore effect deformation first of the sleeve $m$ until the latter has reached a predetermined tension corresponding to its elastic limit. In the case of a swinging motion of said link going beyond said limit, the friction between $n$ and $l_1$ is overcome by initial stress produced in the rubber sleeve $m$, so that the bushing $n$ will pivot with respect to its trunnion $l_1$.

For controlling the frictional engagement in the case of Fig. 3, the axial overlapping $x$ of the bushing $n$ with its trunnion $l_1$ is made adjustable. To this end the trunnions $l_1$, each secured against rotation by means of a screw $p$, are provided respectively with a left-handed thread $q_1$ and a right-handed thread $q_2$. On these threads an adapter sleeve $r$ is screwed which upon rotation increases or diminishes the distance of the trunnions $l_1$, thereby varying the amount of the overlapping $x$, i. e. the amount of the frictional engagement between $n$ and $l_1$.

Figure 4:
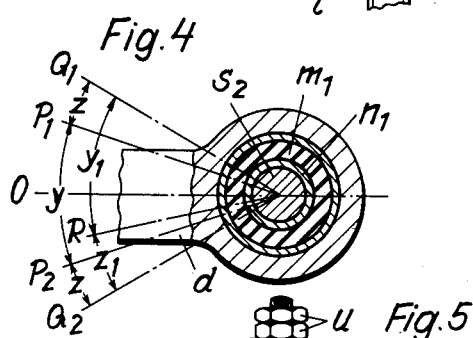
Figs. 4 and 5 show a modified form of embodiment of the mounting of a wheel guiding link with controllable adjustment of the frictional engagement, Fig. 4 being a section on line A—A of Fig. 5 and Fig. 5 a horizontal axial section through said mounting.
Figure 5:
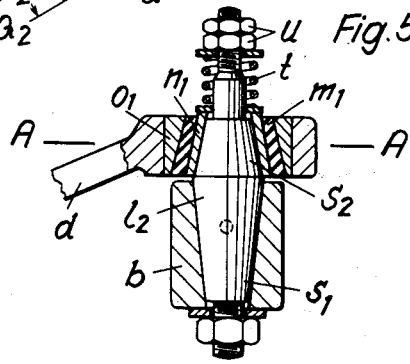

In the example of construction of Figs. 4 and 5 the trunnion $l_2$ for the link $d$ is designed as a double-cone, the cone $s_1$ serving in this case to secure the trunnion in the bracket $b$, the cone $s_2$ taking up a rubber sleeve $m_1$ with reinforcement bushings $n_1$ and $o_1$ respectively, correspondingly designed for supporting the link $d$. While the bushing $o_1$ is again rigidly connected to the link $d$, the inner cone-shaped bushing $n_1$ is mounted with frictional engagement, said frictional engagement being produced by a spring $t$ pressing the bushing $n_1$ against the cone $s_2$, the tension of said spring being controlled by nuts $u$.

The amount of the frictional engagement between $n_1$ and $s_2$ is selected, for example so that starting from the intermediate normal position O of the link $d$ (Fig. 4) the rubber sleeve $m_1$ may yield within a range $y$ between $P_1$ and $P_2$, while the frictional engagement provides a positive connection between the parts $s_2$ and $n_1$. This range may be conveniently so selected that the swinging motions originated in driving on a normal road fall within said range. In the case of swinging deflections going beyond this range (up to the end positions $Q_1$ and $Q_2$ respectively) the frictional engagement will be overcome so that the bushing $n_1$ slides on the cone $s_2$ thereby leaving their central position (in a clockwise direction). During the return swinging motion of the link $d$, the bushing is first held in its dislocated position as long as the swinging motions of the link take place within the range $y_1$, in which those motions are taken up only by the rubber sleeve $m_1$. Upon surpassing the angular position R (range $z_1$), however, the bushing will be taken along again, thereby overcoming the frictional engagement, until it assumes again its original central position under the action of the normal swinging motions.

This mode of operation of the further forms of embodiment of the invention will be similar. Instead of the inner bushings $n$ and $n_1$, of course, also the outer bushings $o$ and $o_1$ may be mounted with frictional engagement. Eventually also both the inner and the outer bushings may have corresponding frictional engagement.

Figure 6:
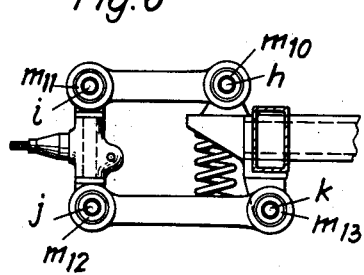

Figure 6 illustrates an embodiment which differs from that of Figure 1 in that all of the joints $h$, $i$, $j$ and $k$ are provided with rubber sleeves $m_{10}$, $m_{11}$, $m_{12}$, and $m_{13}$ having frictional engagement.

Figure 7:
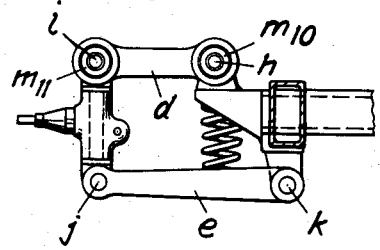
Figs. 6 and 7 are views similar to Fig. 1 of two modified constructions.

In the embodiment according to Figure 7, the joints $h$ and $i$ of the upper short link $d$ are provided with corresponding rubber sleeves $m_{10}$ and $m_{11}$, while the joints $k$ and $j$ of the lower long link $e$ are equipped either with no rubber sleeves or with sleeves having no frictional engagement. This particular embodiment is of interest if there is a very substantial difference in length between the two links so that one of the links, in the present instance link $d$, is disposed through a substantially greater angle than the other upon predetermined oscillating movement of the assembly.

This invention is not limited to the examples of construction illustrated and may find application too to link joints for other purposes, e. g., in motor vehicles for constructional elements not serving for the guidance of the wheels.

What I claim is:

1. In a resilient coupling of oscillating type, a first part having an internal surface, a second part movable relatively to the first part and having an external surface positioned within the internal surface of the first part, a sleeve of resilient material between said surfaces, a metallic bushing interposed between each of said surfaces and said sleeve, the bushings being fixedly connected to the sleeve and free of any mutual connection otherwise than by means of the sleeve and at least one of the bushings being coupled to the associated part by frictional engagement so that said sleeve presents elastic resistance to relative pivotal movement of said parts within a given range, but allows a relative sliding movement when the sheer stress within the sleeve overcomes the frictional resistance between said one bushing and the associated part, and adjustable means controlling said frictional engagement for varying the same.

2. A coupling as in claim 1 wherein the adjustable controlling means comprise means for controlling the extent of axial engagement between the one said bushing and the part associated therewith.

3. A coupling as in claim 1 wherein at least one of of the bushings and the part associated therewith are provided with complementary conical surfaces, and wherein the adjustable controlling means comprise spring means exerting an axial pressure in the direction of engagement of said conical surfaces to cause a wedging effect.

4. A coupling as in claim 1 wherein the metal bushings are vulcanized to the sleeve.

5. A coupling as in claim 4 wherein the surface of the bushing coupled to the associated part is provided with a coating of self-lubricating effect.

6. A coupling as in claim 5 wherein the bushing is coated with copper.

7. A coupling as in claim 5 wherein the bushing is coated with cadmium.

8. In a resilient coupling of oscillating type, a first part having an internal surface, a second part movable relatively to the first part and having an external conical surface positioned within the internal surface of the first part, a sleeve of resilient material between said surfaces, a metallic bushing interposed between said conical surface and said sleeve provided with complementary conical surfaces, a metallic bushing interposed between said internal surface of said first part and said sleeve, said bushing with conical surfaces being coupled to said second part by frictional engagement so that said sleeve presents elastic resistance to relative pivotal movement of said parts within a given range, but allows a relative sliding movement when surpassing said range, and spring means exerting an axial pressure in the direction of engagement of said conical surfaces of said second part and said conical bushing to cause a wedging effect.

9. A coupling as in claim 8 further comprising means for adjusting the tension of the spring means.

10. In a resilient coupling of oscillating type, a first part having an internal surface, a second part movable relatively to the first part and having an external surface positioned within the internal surface of the first part, a sleeve of resilient material between said surfaces, a metallic bushing interposed between said sleeve and one of said parts, said sleeve being fixedly connected to the other of said parts and to said bushing, and said bushing being free of any connection to said other part otherwise than by means of said sleeve and being coupled to said one part by frictional engagement with the said surface thereof so that said sleeve presents elastic resistance to relative pivotal movement of said parts within a given range, but causes a relative sliding movement when the sheer stress within the sleeve overcomes the frictional resistance between said bushing and said one part and adjustable means controlling said frictional engagement for varying the same.

11. In a resilient coupling of oscillating type, a first part having an internal surface, a second part movable relatively to the first part and having an external surface positioned within the internal surface of the first part, a sleeve of resilient material between said surfaces, a metallic bushing interposed between said sleeve and the external surface of said second part, said sleeve being fixedly connected to said first part and to said bushing, and said bushing being free of any connection to said first part otherwise than by means of said sleeve and being coupled to said second part by frictional engagement so that said sleeve presents elastic resistance to relative pivotal movement of said parts within a given range, but causes a relative sliding movement when the sheer stress within the sleeve overcomes the frictional resistance between said bushing and said second part and adjustable means controlling said frictional engagement for varying the same.

References Cited in the file of this patent

UNITED STATES PATENTS

| | | |
|---|---|---|
| 1,823,450 | Helmond | Sept. 15, 1931 |
| 1,828,539 | Lord | Oct. 20, 1931 |
| 1,871,861 | Rossman | Aug. 16, 1932 |
| 1,911,866 | Wylie | May 30, 1933 |
| 1,939,444 | Geyer | Dec. 12, 1933 |
| 2,169,335 | Best | Aug. 15, 1939 |
| 2,232,397 | Leighton | Feb. 18, 1941 |
| 2,324,997 | Brown | July 20, 1943 |
| 2,403,145 | Ulrich | July 2, 1946 |
| 2,428,950 | Weiss | Oct. 14, 1947 |
| 2,564,605 | Martin | Aug. 14, 1951 |

FOREIGN PATENTS

| | | |
|---|---|---|
| 410,282 | Great Britain | May 17, 1934 |
| 701,360 | France | Jan. 7, 1931 |